United States Patent [19]

Mouille et al.

[11] 3,967,918
[45] July 6, 1976

[54] ROTOR FOR ROTATING WING TYPE AIRCRAFT

[75] Inventors: René Louis Mouille, Aix-en-Provence; René Louis Coffy, Marseille; Michel Aimé Hancart, Marignane; Daniel Mao, Marseille, all of France

[73] Assignee: Societe Nationale Industrielle Aerospatiale, Paris, France

[22] Filed: May 10, 1974

[21] Appl. No.: 469,045

[30] Foreign Application Priority Data
May 10, 1973 France .............................. 73.16887
Mar. 7, 1974 France .............................. 74.7776

[52] U.S. Cl. ........................... 416/141; 416/134 A; 416/138; 416/241 A
[51] Int. Cl.² ......................................... B64C 27/38
[58] Field of Search ........... 416/134, 135, 138, 140, 416/141, 134 A, 139, 136, 244, 241 A

[56] References Cited
UNITED STATES PATENTS

| | | | |
|---|---|---|---|
| 2,405,777 | 8/1946 | Buivid | 416/143 |
| 3,026,942 | 3/1962 | Cresap | 416/141 UX |
| 3,106,965 | 10/1963 | Gorndt et al. | 416/141 |
| 3,193,019 | 7/1965 | Drees et al. | 416/141 |
| 3,292,712 | 12/1966 | Schmidt | 416/141 |
| 3,384,185 | 5/1968 | Fernandez | 416/141 X |
| 3,484,172 | 12/1969 | Reed | 416/134 A X |
| 3,501,250 | 3/1970 | Mosinskis | 416/141 X |
| 3,556,673 | 1/1971 | Killian | 416/141 X |
| 3,606,575 | 9/1971 | Lermusiaux | 416/135 |
| 3,652,185 | 3/1972 | Cresap et al. | 416/136 X |
| 3,700,352 | 10/1972 | Gorndt | 416/141 X |
| 3,761,199 | 9/1973 | Ferris et al. | 416/141 X |
| 3,762,834 | 10/1973 | Bourquardez et al. | 416/135 UX |
| 3,790,302 | 2/1974 | Pascher | 416/141 X |
| 3,804,552 | 4/1974 | Covington | 416/134 |
| 3,807,896 | 4/1974 | Johnson | 416/135 X |

*Primary Examiner*—Everette A. Powell, Jr.
*Attorney, Agent, or Firm*—Karl W. Flocks

[57] ABSTRACT

An improved rotor for a helicopter comprises a yoke at the inner end of each arm engaging the rotor hub by way of a spherical abutment.

12 Claims, 7 Drawing Figures

ROTOR FOR ROTATING WING TYPE AIRCRAFT

This invention relates to an improved rotor for rotating wing type aircraft.

The emphasis in research on the rotors of rotating wing type aircraft, more particularly helicopters, is mainly on simplifying some of the rotor hub elements and cutting out ball, needle and roller bearings from joints so as to lengthen the between-servicing intervals and increase the working life of such elements, which are heavily stressed by centrifugal forces arising from rotation of the blades providing the movements necessary for rotor operation.

Hubs made of metal or reinforced plastics are known wherein the beating and drag movements and in some cases the incidence-changing movements are achieved as a result of the flexibility of the arm which retains each blade.

Since the arms experience considerable alternate forces, it is difficult to reach a satisfactory compromise between the necessary flexibility for satisfactory rotor operation and a dynamic stress level which is low enough not to make rotor life too short.

Also known are metal rotor constructions wherein the beating, drag and pitch variation movements are provided through the agency of articulations in the form of elastomeric bearings deformable by distortion. However, since such bearings experience tensile as well as bending forces, the heavy stressing which they undergo shortens their life and makes it difficult to devise them to be of very small weight and bulk.

This invention relates to a helicopter rotor which obviates these various dimensioning and operating disadvantages and which requires virtually zero servicing in operation.

The rotor according to the invention, whose star-shaped hub comprises for each blade of the rotating wing system a connecting arm which is flattened in the plane of the star and flexible in the direction perpendicular to such plane is characterised in that the blade has at its inboard end a yoke which is directed towards the hub and whose arms engage around the flat part of the corresponding arm, and the connection between the blade and the arm is by way of: a spherical abutment compressed between the ends of the yoke arms and the outside edge of an aperture in the hub at the base of the arm; and the sliding and rotating co-operation of the arm end with the yoke base.

The spherical abutment transmits centrifugal forces from the blade to the hub and enables blade pitch to be altered and the blade to "beat".

Preferably, the spherical abutment takes the form of a stack of rigid strips alternating with elastomeric strips vulcanised to one another; the strips in shape resemble a spherical cap whose centre corresponds to the imaginary centre around which the blade pivots as it beats by bending of the arm.

Advantageously, the sliding and rotating cooperation of the arm end with the yoke base is embodied by making the arm end in the form of a cylindrical spigot engaged in a bore in the yoke base with the interposition of a ring adapted to slide in a swivel whose outer race is engaged in the bore.

Preferably, the connection also comprises a resilient and damping facility having one end secured to a lug or the like rigidly secured to the yoke while the other end is rigidly secured to the blade trailing edge. A facility of this kind serves as a frequency matching device which, by greatly reducing resonances arising from vibrations, and excessive stresses in the rotor, helps to optimise the distribution of the natural vibration modes of the dragging blades relatively to the normal speed of rotor rotation. More particularly, the facility helps to shift the first drag vibration mode appreciably below the value of rotor speed in flight without any need to make the arm flexible in its plane, so that arm shape and strength can be optimised to give optimum beating flexibility.

To provide mechanical limitation of alternate drag movements in the hub and thus obviate the risk of the resilient and damping facility accidentally being subjected to excessive shear stressing likely to damage it, the yoke connecting a blade to the hub comprises, in an advantageous form of the invention, two parallel plates rigidly engaging between them the blade roots and holding captive by way of a visco-elastic substance a sliding swivel disposed at the end of the flexible arm.

Preferably in this case, such swivel is enclosed in a casing or box having parallel plane surfaces and the visco-elastic material is distributed in the form of two plates interposed between the yoke plates and such surfaces of the casing.

The blade can then make angular movements only in the rotor plane, the visco-elastic material providing the restoring or return force which maintains the blade in a mean position and damps blade vibrations in the drag direction.

If the two yoke-forming plates are assembled by means of cross members so as to apply a predetermined compression to the visco-elastic substance, the blade can be secured to the two yoke-forming plates at the end remote from the hub as well, by means of two pins equidistant from the hub axis, one such pin being releasable while the other forms an axis around which the blade can fold, so that the space taken up by the blades can be reduced when helicopters having such rotors are being transported or when it is required to store them in a reduced space.

One of the cross members can carry the blade pitch control lever, to provide direct pitch control action on the operative parts of the blades.

Embodiments of the invention are shown in the drawings wherein.

Figure 1:
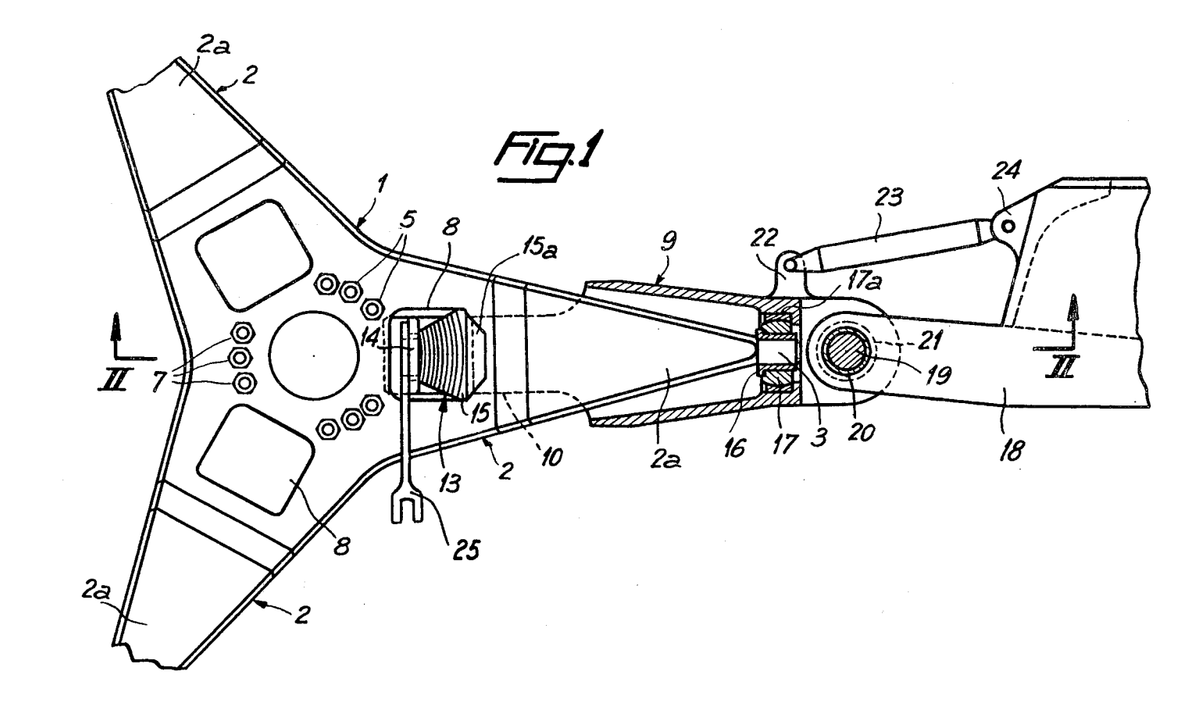
FIG. 1 is a plan view in partial section, with the sectioned parts removed, of an improved three-bladed rotor according to the invention.
Figure 2:
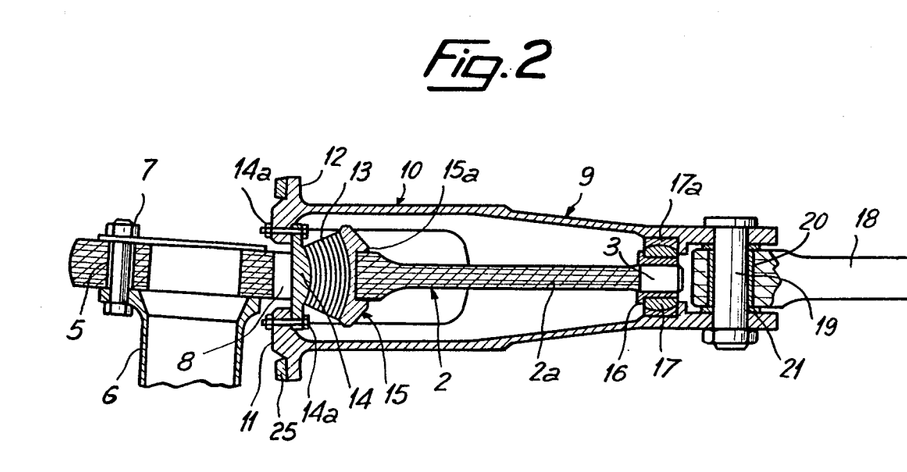
FIG. 2 is an axial section on the line II — II of FIG. 1.

In the embodiment which is shown in FIGS. 1 and 2 and which is for a three-bladed rotor, a hub 1 is embodied basically as a flattened star made of glass fibre enveloped in thermoset resin and having as many arms 2 as the rotor has blades. The arms 2 are in shape triangular and terminate in a cylindrical spigot or the like 3. The flexible outside part 2a of each arm thins progressively relatively to the central part, the latter being formed with apertures 5 adapted to receive a ring of screwed fasteners 7 for securing the star to the top part of a vertical shaft 6 which acts as a mast. Each star arm is formed in its base and very near the mast securing zone — i.e., in the thick zone of the star — with a rectangular aperture 8.

Each arm 2a is received in a metal sleeve 9 having a cylindrical portion which is divided near the hub to form two yoke arms 10 extending around the flat part or facet of the flexible arm 2a. The members 10 terminate towards the hub in an inner shoulder 11 and a partial outside collar 12. Sleeve 9 is secured to arm 2a by way of an abutment 13 consisting of alternate strips of rigid metal and elastomer; the strips, which are assembled by vulcanisation, in shape resemble partial spheres whose centre is on the side near the hub. Abutment 13 is received in aperture 8 and interposed between the sleeve shoulders 11 — to which it is secured by bearing member 14 and screwed fasteners 14a — and the outside edge of aperture 8, abutment 13 bearing on such edge by way of a cup-like member 15, the two outer protuberances 15a of member 15 gripping the outer edge of aperture 8.

Spigot 3 of arm 2a is recceived in a bore in the end of sleeve 9 with the interposition of a ring 16 slidable in a preferably self-lubricating swivel 17 whose outer race 17a is fitted in the last-mentioned bore. Sleeve 9 terminates towards the outside in a yoke for securing the blade 18 with the interposition of a spindle 19 extending through an antifriction ring 20 rigidly secured to the bore in the blade root, and of two thrust washers 21 interposed between the outside surfaces of the blade root and the inside surfaces of the yoke. Sleeve 9 also has a lateral lug or the like 22 having secured to it the end of a resilient and damping facility 23 whose other end is rigidly secured to trailing edge 24 of blade 18.

This damped resilient connection between sleeve 9 and blade 18 comprises a visco-resilient substance — i.e., a substance which can resiliently restore some of the received energy while absorbing the remainder. Thanks to this system, the blade has some freedom to rotate in the rotor plane relatively to the hub but is always returned to a mean position with a force proportional to the movement away from such position in either direction, the return being provided with a high rate of damping. A blade-to-hub connection of this kind is suitable in most cases when the natural oscillation frequency of the dragging blade is below the nominal speed of the rotor. If, however, such natural frequency is above the nominal speed of the rotor, the connection between blade 18 and sleeve 9 can be a rigid one (see FIG. 3).

Secured to the partial collar 12 by screwed fasteners (not shown) is a lever 25 which is connected to the helicopter flight controls system and which is a means of controlling the incidence of blade 18.

In this embodiment the centrifugal forces coming from blade 18 are taken up directly in the central part of the hub by way of sleeve 9 and abutment 13 without affecting the flexible arm 2a; consequently, the latter can be of a size and design best suited to cope with the beating bendings due to the blades. In such bendings each blade pivots substantially around the centre of the part-spherical members which form the abutment 13. As a result of distortion of the elastomer strips of abutment 13, the same enables the blade angle of incidence to vary, the various part-spherical portions of the rigid strips sliding and turning slightly relatively to one another.

Figure 3:
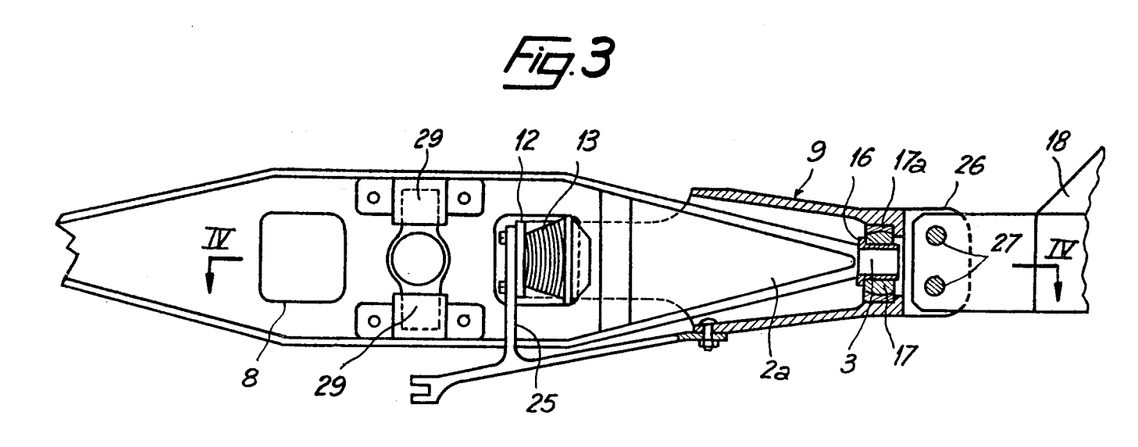
FIG. 3 is a plan view in partial section of a two-bladed rotor according to the invention.
Figure 4:
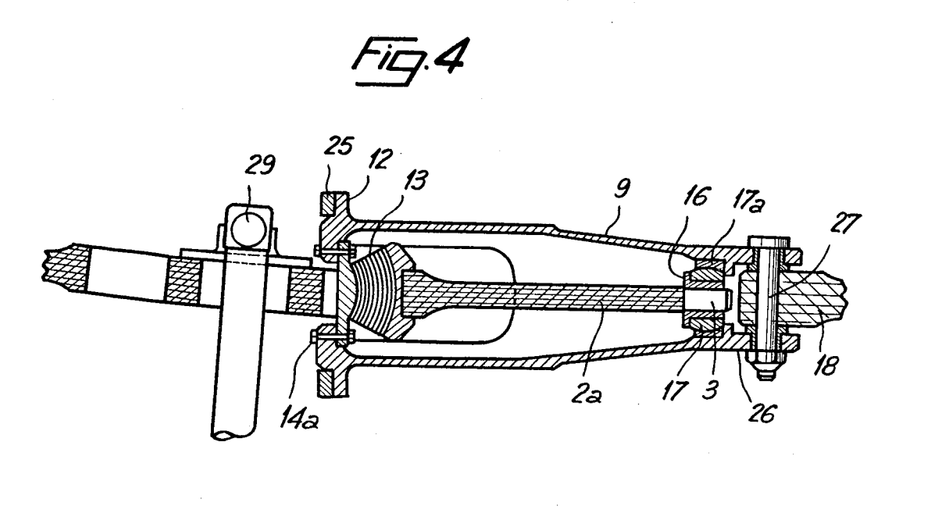
FIG. 4 is an axial section on the line IV — IV of FIG. 3.

FIGS. 3 and 4 show another embodiment of a hub having the improvements according to this invention in the case of a two-bladed rotor. In this case the flexible arm 2a, sleeve 9, laminated abutment 13, spigot 3, ring 16 and swivel 17 are similar to what is shown in FIGS. 1 and 2, but there is a see-saw mounting of the hub on the mast — i.e., an articulation 29 is provided whose axis is perpendicular to the mast and which is disposed above the hub and which enables the whole rotor to tilt relatively to the mast. This articulation or joint, which experiences zero centrifugal loading, can be embodied by two needle bearings or two self-lubricating rings or two plain cylindrical bearings which can be deformed elastomerically and which are e.g. laminated devices. As can be seen in FIG. 3, each blade 18 is connected to sleeve 9 by means of a double yoke 26 and of two spindles 27 which provide a completely rigid connection between the blade and the sleeve 9.

Figure 5:
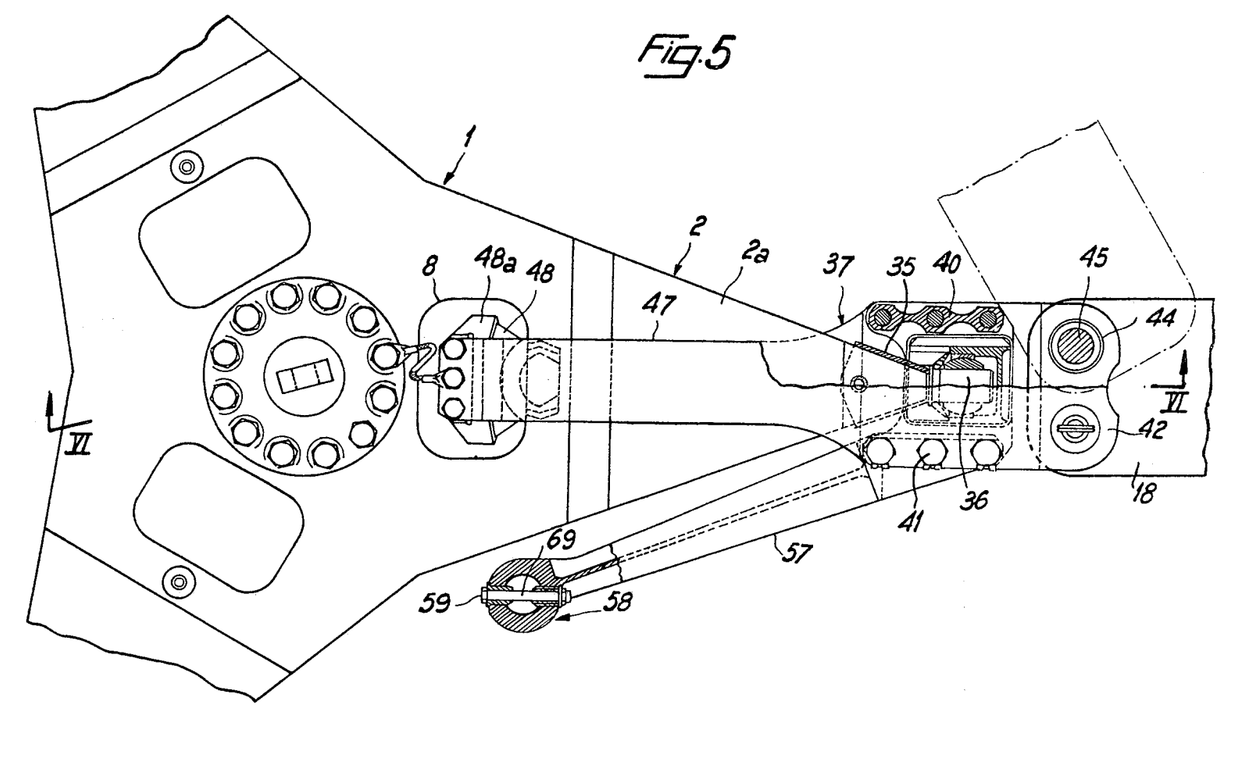
FIG. 5 is a plan view, with some parts broken away, of an improved form of rotor.

Referring to the embodiment shown in FIGS. 5 and 6, the hub again takes the form of a flat star 1 made of glass fibres enveloped in thermoset resin and having as many arms 2 as the rotor has blades 18. The arms 2, which are in shape triangular, have a reduced-thickness central portion 2a are pierced at the base with an aperture 8 and are engaged, by their free end of normal thickness, in a shoe 35 which is extended by a cylindrical spigot 36. The connection between arm 2 and blade 18 is by way of a yoke having the general reference 37. The same, which is shown in detail in FIG. 7, comprises two plane plates 38, 39 which are spaced apart from one another by cross members 40 and which are interconnected by screwed fasteners 41. On the blade side the plates 38, 39 are thickened and form a second yoke whose flanges or cheeks 42 are formed with four apertures 43 in the form of facing pairs, the apertures 43 having sockets 44 to receive two spindles 45 for retaining the blade 18. As can be seen, one of the two spindles 45 has a hairpin-like member 46 enabling the corresponding spindle to be withdrawn so that the blade can in known manner pivot around the spindle 45 still in position (FIG. 5). On the hub side the two plates 38, 39 form two yoke arms 47 which engage substantially around the portion 2a of each arm.

Figure 6:
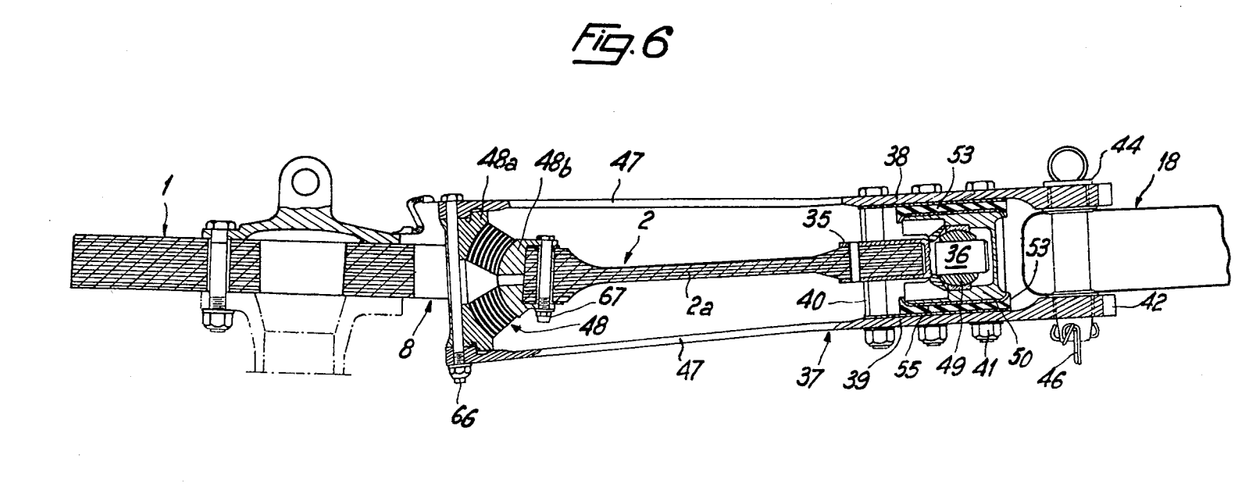
FIG. 6 is a section on the line VI — VI of FIG. 5.
Figure 7:
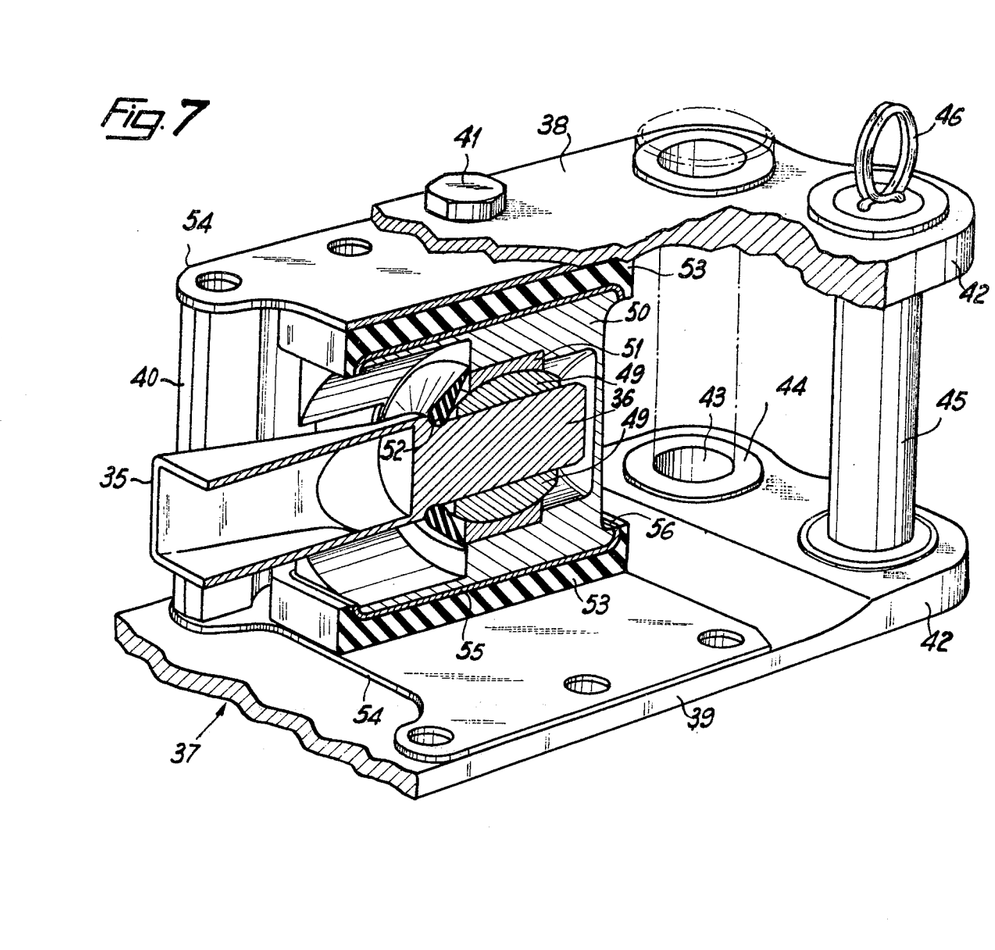
FIG. 7 is a perspective view, with some parts broken away, of the end of the connecting yoke between a blade and the rotor hub in the embodiment of FIGS. 5 and 6.

Yoke 37 is secured to arm 2 by means of a spherical abutment 48 embodied, as in the previous embodiment, by alternate part-spherical strips of metal and elastomer and received in aperture 8 between, on the one hand, a cup-shaped member 48a on which its convex surface bears and which is secured to the ends of arms 47 by screwed fasteners 66, and, on the other hand, a swivel 48b on which the concave surface of the sphere bears and which is secured by screwed fastener 67 to the outside edge of aperture 8.

Since in this case the flexible part 2a of the arm is disposed beyond the abutment, the centre thereof is disposed near the arm end and not, as in FIGS. 1 to 3, towards the hub axis.

The cylindrical spigot 36 is engaged in a swivel 49 received in a casing 50 with the interposition of a spherical bearing 51 in which swivel 49 is mounted; a lipped gasket 52 disposed between casing 50 and spigot 36 closes the hollow interior of the swivel-receiving casing 50.

The resilient and damping facility is interposed directly between the integer 50 and the two flat plates 38, 39 and is embodied by two plates 53 which are in plan substantially square and which are made of a very rigid silicone elastomer having a high deformation remanence. Substances of this kind provide a visco-elastic effect — i.e., a restoring action combined with damping.

Each integer 53 is stuck by vulcanisation to a member 54 in the case of each plate 38 or 39 and, in the case of casing 50, to a cover 55 which has a dropped edge right around its periphery and which fits into the outside surface of casing 50. The whole is retained in position by the two plates 8 and 9 being interconnected by screwed fasteners.

Elastomeric plates of this kind, which serve both as return springs because of their resilience and as dampers because of their remanence, help to reduce considerably the frequency of the first vibration mode of a dragging blade, giving a value of something like 60% of the nominal rotor speed, and to provide the necessary damping to pass through the rotational speed corresponding to drag resonance at starting and stopping of the rotor without excessive dynamic stressing in the blade and the elements securing the same to the hub, and to eliminate in flight resonance phenomena arising from variations of forces due to movement in the surrounding air.

Disposing the resilient and damping facility within the blade-carrying system in this way is very advantageous as regards weight and therefore cost, since the plates 38, 39 and the swivel-receiving casing serve as plates for the frequency-matching elements without the need for any further elements, inter alia levers, as in the conventional forms of systems of this kind.

Another advantage is that angular movements of yoke 7 relatively to the end 2a of the flexible arm in the plane of the rotor are limited mechanically by the side surfaces of casing 20 abutting the cross members 10 interconnecting the two plates 8, 9. Consequently, any accidental excess of drag forces or torques on the blade roots, for instance, due to overacceleration or overdeceleration of the rotor, cannot damage the resilient and damping facility, since the movements permitted by this mechanical abutment are reduced to values which are definitely below the strength limits of the abutment.

One of the cross members 40 — the one disposed on the blade leading edge side — is extended along the flexible arm 2 to form a pitch lever 57 whose end has a connection, such as a lug 58 and spindle 59, for a rod connected to the helicopter rotor pitch control system.

The length of the lever 57 is so determined that the articulation centre 69 of the rod on the lever is disposed substantially on the perpendicular to the blade axis passing through the centre of the laminated abutment 48; consequently, the beating movements of the flexible arm 2 when the rotor is in operation do not affect the pitch lever control point position and so do not introduce interferring movements into the blade.

Another advantage of the latter feature over the systems previously described is that control forces are transmitted directly to the blade, thus greatly reducing interferring distortions. The same feature also helps to reduce the width of the yoke arms 47, to which the control actuation applies no torsion but which experience solely the centrifugal force coming from the blade.

The invention is of use for all rotating-wing aircraft, more particularly helicopters.

We claim:

1. A rotor for a rotating-wing craft comprising a driving shaft, a flat star-shaped rotor hub made of resin-reinforced glass fibres and substantially extending in a plane perpendicular to said driving shaft, said rotor having a central part adapted for being secured to the end of said driving shaft and a plurality of flat arms extending each from said hub central part substantially along a radial axis in said plane, said hub central part and flat arms having, in the direction perpendicular to said plane, respective thickness of substantially different values so that said central part is rigid and said flat arms are flexible in said direction, a same plurality of rotor blades having each a root part, disposed in closed relationship to the outer end of one of said hub arms, each rotor blade extending from its root part substantially along said radial axis, first and second means for connecting the root part of each rotor blade to said hub central part and to the outer end of said hub arm respectively, said first and second connecting means being adapted for permitting resiliently limited rotations and sliding displacement of said blade root part around and along said radial axis in relation to said hub central part and arm, and said first connecting means being further adapted for transmitting centrifugal radial forces from said rotor blade directly to said rigid hub central part, whereby flapping movements of the rotor blades in said direction are permitted by the flexible hub flat arms and said connecting means.

2. A rotor according to claim 1, wherein a same plurality of apertures having each an inside edge and an outside edge is arranged in said hub central part substantially on the respective radial axes of said hub arms, and said first connecting means comprises for each rotor blade a yoke having an end part connected to the root part of the respective blade and two arms extending from said end part along the radial axis of the respective hub arm to the central part aperture on said radial axis, said yoke arms passing at a distance from the two faces of said hub flat arm respectively, and a spherical abutment having an elastically deformable member inserted between the inner ends of said yoke arms and the outside edge of said aperture.

3. A rotor according to claim 2, wherein a cylindrical spigot is formed in the outer end of each hub arm, said spigot extending along the radial axis of said hub arm, and said second connecting means comprises a ball swivel mounted in said yoke end part, between the outer ends of said yoke arms, said ball swivel comprising a spherical bearing and a ball having a cylindrical recess extending all along a diameter thereof, said ball being mounted to freely rotate, in said spherical bearing and said hub arm end spigot being engaged in said ball recess to freely rotate therein.

4. A rotor according to claim 3, wherein said yoke end part consists of two parallel rigid metal plates extending substantially in planes parallel to the plane of the flat rotor hub, from the respective outer ends of said yoke arms to the respective blade root part, to which the outer ends of said rigid plates are connected, and said ball swivel is inserted between said rigid plates with the interposition of visco-elastic damping means.

5. A rotor according to claim 4, wherein the ball swivel comprises a casing having two opposite faces substantially parallel to said rigid metal plates, and two plates of a visco-elastic substance are inserted between said rigid metal plates and said casing faces respectively.

6. A rotor according to claim 5, wherein rigid cross-members are mounted between said rigid metal plates, the length of said cross-members being superior to the distance between said casing opposite faces by a predetermined amount slightly inferior to the sum of the respective thicknesses of said visco-elastic plates, whereby said visco-elastic plates are submitted to a predetermined compressive deformation.

7. A rotor according to claim 6, wherein a pair of said cross-members is disposed to form abutments for the edges of the respective hub arm so as to limit the displacements of the respective rotor blade in the plane of the rotor hub in relation to said hub arm.

8. A rotor according to claim 6, wherein a blade pitch control lever is connected to one of said cross-members.

9. A rotor according to claim 8, wherein the free end of said blade pitch lever is disposed in a plane substantially perpendicular to the axis of the respective hub arm and rotor blade, said plane passing through the center of said spherical abutment.

10. A rotor according to claim 5, wherein each visco-elastic plate if secured by vulcanization on one side to a thin plate applied on the respective rigid metal plate, and, on the other side, to a cover disposed on the respective face of said swivel casing.

11. A rotor according to claim 4, wherein the outer ends of said rigid metal plates are connected to the respective blade root part by two spindles disposed in a substantially symmetrical relationship to the axis of the respective blade, one of said spindle being releasable.

12. A rotor according to claim 2, wherein the blade yoke is a sleeve formed with two divisions opposite one another, the deformable member bearing on terminal inside shoulders of the sleeve, a pitch control lever being secured to an outside collar of the sleeve end.

* * * * *